(12) United States Patent
Fisher

(10) Patent No.: US 6,177,368 B1
(45) Date of Patent: Jan. 23, 2001

(54) BLAST RESISTANT LAMINATE COMPOSITE CONTAINER WALL CONSTRUCTION

(76) Inventor: Russell J. Fisher, 21525 Lancelot Dr., Brookfield, WI (US) 53045

( * ) Notice: Under 35 U.S.C. 154(b), the term of this patent shall be extended for 0 days.

(21) Appl. No.: 09/039,836

(22) Filed: Mar. 16, 1998

(51) Int. Cl.$^7$ .............................. B32B 5/26; B32B 15/00
(52) U.S. Cl. .................... 442/221; 442/224; 442/225; 442/247; 442/251; 442/261; 442/268; 428/911
(58) Field of Search .................................. 442/134, 135, 442/221, 224, 225, 247, 251, 261, 268, 288; 428/911

(56) References Cited

U.S. PATENT DOCUMENTS

| | | | |
|---|---|---|---|
| 5,590,803 | * | 1/1997 | Kaempen ............................. 220/461 |
| 5,645,184 | * | 7/1997 | Rowse et al. ......................... 220/1.5 |
| 5,654,053 | * | 8/1997 | Crane et al. ......................... 428/36.5 |

* cited by examiner

Primary Examiner—Elizabeth M. Cole
Assistant Examiner—Arti Singh
(74) Attorney, Agent, or Firm—Andrus, Sceales, Starke & Sawall, LLP

(57) ABSTRACT

A blast resistant laminate composite container wall construction is provided for a bomb-resistant airline baggage container for withstanding gas-expansion explosives. A PVC substrate core (26) of sufficient thickness, at least about 0.5 inch, is used to provide a substantially rigid container wall. A first layer (28) of 0.02 inch thick woven roving fiberglass is on one side of the core, a second layer (30) of 0.02 inch thick woven roving fiberglass is on the first layer, a third layer (32) of 0.02 inch thick woven roving fiberglass is on the second layer, a fourth layer of 0.03 inch thick random chopped strand fiberglass is on the third layer, a fifth layer of 0.03 inch thick random chopped strand fiberglass is on the fourth layer, a sixth layer of 0.02 inch thick woven roving fiberglass is on the other side of the core, a seventh layer of 0.02 inch thick woven roving fiberglass is on the sixth layer, an eighth layer of 0.02 inch thick woven roving fiberglass is on the seventh layer, a ninth layer of 0.03 inch thick random chopped strand fiberglass is on the eighth layer, and a tenth layer of 0.03 inch thick random chopped strand fiberglass is on the ninth layer.

5 Claims, 1 Drawing Sheet

BLAST RESISTANT LAMINATE COMPOSITE CONTAINER WALL CONSTRUCTION

BACKGROUND AND SUMMARY OF THE INVENTION

The invention relates to a container wall construction for a bomb-resistant airline baggage container for withstanding gas-expansion explosives.

The invention arose out of efforts to improve commercial airline safety, including making the commercial airline industry less vulnerable to terrorism by containing a blast of a bomb in luggage in the cargo hold of the airplane. In wide bodied jets, i.e. two aisles, passenger luggage is stored in a baggage container which in turn is stowed in the cargo hold of the airplane. Narrow bodied jets, i.e. single aisle, do not use containers to store luggage; instead, the luggage is stored directly in the cargo hold, without a container. If a baggage container were used in both narrow bodied and wide bodied jets, and if such baggage container were blast resistant, or at least could mitigate the effects of an explosion, then lives could be saved. The present invention provides container wall construction for bomb-resistant airline baggage containers for both wide bodied and narrow bodied jets.

In accordance with the present invention, it has been found that a construction of a core and a particular combination and sequencing of fiberglass layers provides a suitable blast resistant laminate composite container wall construction. Materials traditionally associated with bomb-resistance, such as Kevlar®, were found unsuitable for various reasons, including temperature and fire resistance, difficulty in bonding to a core to provide a substantially rigid container wall, and manufacturability within reasonable cost. Fiberglass composites have traditionally not been associated with bomb-resistant applications. The combination in the present invention satisfies criteria particular to bomb-resistant airline baggage containers, including strength to weight ratio, stiffness to weight ratio, temperature and flammability resistance, impact and shock hole resistance, cost, manufacturability, and gas-expansion explosive withstand capability. The latter is significant in airline baggage containers because the clothing in the luggage will absorb and mitigate significant amounts of projectile energy, however there remains the need to withstand the destructive almost instantaneous pressure rise and shock wave from gas-expansion explosives, including plastic explosives.

DETAILED DESCRIPTION

Figure 1:
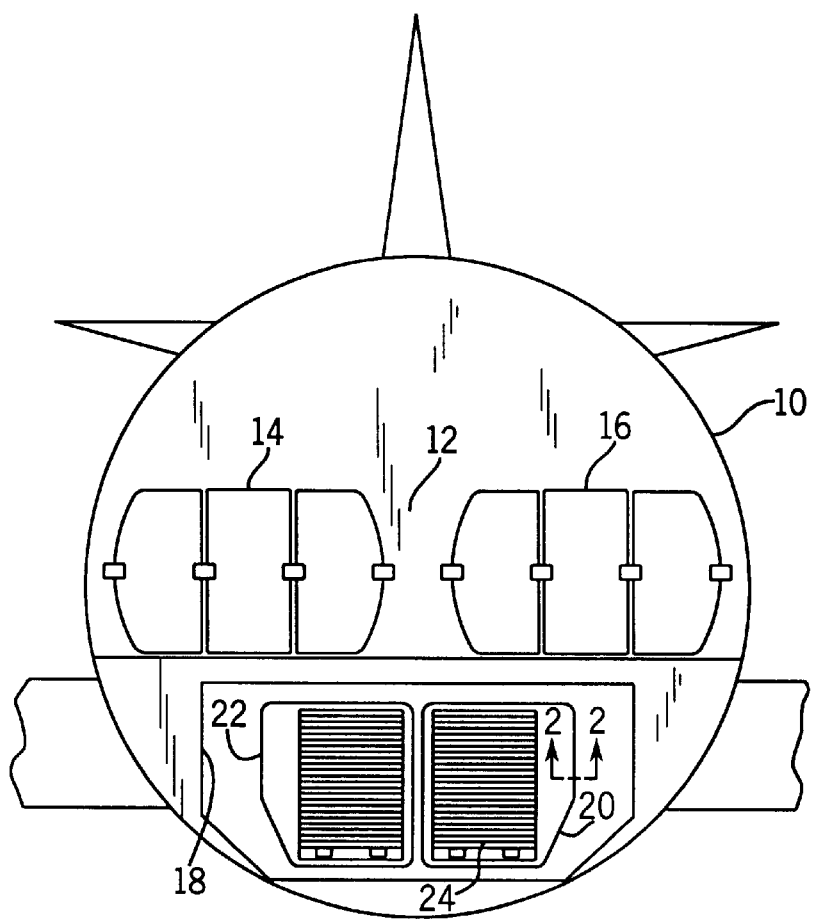
FIG. 1 is a schematic sectional view of an airplane.

In accordance with the present invention, a multilayer composite with a core is provided, and the optimum number of layers has been determined for the noted application of a blast resistant laminate composite container wall construction for a bomb-resistant airline baggage container for withstanding gas-expansion explosives. Design criteria include temperature and fire resistant material with good strength, shock hole and impact resistance, manufacturability at a reasonable cost, and minimum weight which is critical in commercial airline application. The present invention provides a combination enabling the use of fiberglass instead of aramids such as Kevlar® and instead of polyethylenes such as Spectra®, and maintaining strength at high temperature, better fire and smoke performance, ease of fabrication, and low weight. Furthermore, because a core is desirable for absorbing energy and to enable sufficient thickness to provide a substantially rigid container wall, the use of fiberglass is particularly desirable over Kevlar® or Spectra® because the latter two involve greater difficulty in forming a bond with a core. The following explains the design rational which led to the materials and construction of the presently found embodiment suitable for the noted application.

The material was selected based on several design criteria, including strength to weight ratio, stiffness to weight ratio, temperature and flammability resistance, impact and shock hole resistance, cost, manufacturability. Because of favorable stiffness and strength to weight ratios, fiber reinforced plastics were initially given consideration. This class of materials draws its strength and character primarily from the fiber reinforcement material and thus several fiber materials were considered, namely carbon, E-glass, S-glass, aramid such as Kevlar®, and polyethylene such as Spectra®. Carbon fiber was eliminated as a candidate material because it is too brittle, and not suitable for impact applications. It is also relatively expensive. Spectra® fiber, though a good candidate in many ways, was eliminated because of its poor high temperature and fire performance characteristics as well as high cost. For the remaining candidate materials, comparisons of fiber toughness, impact resilience and impact deformation, and cost, indicated S-glass, specifically S-2-glass offered the best combination of desired properties. Kevlar® begins to degrade at relatively low temperatures as compared to glass, and hence the choice of glass fiber thereover provides better assurance of maintaining strength at high temperature. Other benefits of S-2-glass over the aramids include better fire and smoke performance and ease of fabrication. Further, in accordance with the present invention it has been determined to use a core to absorb energy and also of sufficient thickness to provide a substantially rigid container wall for commercial airlines, and because of this the use of glass is further desirable because of its bonding capability with the core, as opposed to Kevlar® or Spectra® which are more difficult to bond. The selected resin is an unsaturated polyester styrene monomer resin from Cook Composite Company, No. 40-2812, which is a standard fire retardant grade used in the composite industry. This type of resin has comparatively low flame spread characteristics when compared to general purpose polyesters and vinylesters.

In selecting the core material, polyurethane and polypropylene were eliminated from consideration due to toxicity and burn performance. While materials such as nomex and polymethacrylmide (PMI) foam would perform well in fire testing, the core material selected was polyvinylchloride (PVC), namely AIREX® R63 available from Baltec Company. This material was chosen for its toughness and ability to absorb energy and also because it is easier than honeycomb to build into a wall construction. When used with fire retardant glass skins, it performs well in burn tests with the glass acting as a fire blanket. In the preferred embodiment, a thickness of 0.5 inch is used. Core properties as listed by the manufacturer are tensile strength of 260 pounds per square inch (psi), shear strength of 170 psi, tensile modulus of 9,280 psi, and shear modulus of 3,045 psi.

Constructions without a core were considered, including a laminate of a build-up of woven cloth layers. However, a combination construction including the core was selected to significantly increase moment of inertia which increases bending stiffness of corner areas, particularly desirable for an airline baggage container, and reducing overall maximum deflection. Minimizing deflection is a design goal because excessive deflections of the container within the cargo hold of the airplane would cause collateral damage to the aircraft structure. In addition to the increased moment of inertia, the use of a core provides a standoff which will increase shock hole resistance quality of the unit.

Based on stress, stiffness, weight and standoff considerations, the following laminate code for construction was developed for the container wall, $$M_2/R_3/C/R_3/M_2$$

where: M is a random chopped strand glass mat layer, 0.03 inch thick, available from Owens Corning under product code M723, and $M_2$ means two layers thereof; R is woven roving 24 ounce (24 ounces per square yard) S-2-glass, 0.02 inch thick, product code SBA240 D-50 from Knytex, a division of Owens Corning, and $R_3$ means three layers thereof; C is the above noted PVC core. The random mat layers on the ends of the construction provide durability and protect the woven roving layers from damage due to point impact forces, e.g. forklift and handling impacts, and also enhance the manufacturability of the unit. A pigmented unsaturated polyester gel coat, 0.02 inch thick, is additionally provided on the outermost layer which will be the exterior of the container.

FIG. 1 shows an aircraft 10 with a single aisle 12, right and left sets of passenger eats 14 and 16, and a lower cargo hold 18. A plurality of baggage containers such as 20 and 22 are secured in hold 18, each container holding a plurality of pieces of passenger luggage. The dimensions of each container are specified according to the aircraft and include a door such as 24, such as a vertical roll top type door, which forms no part of the present invention.

Figure 2:
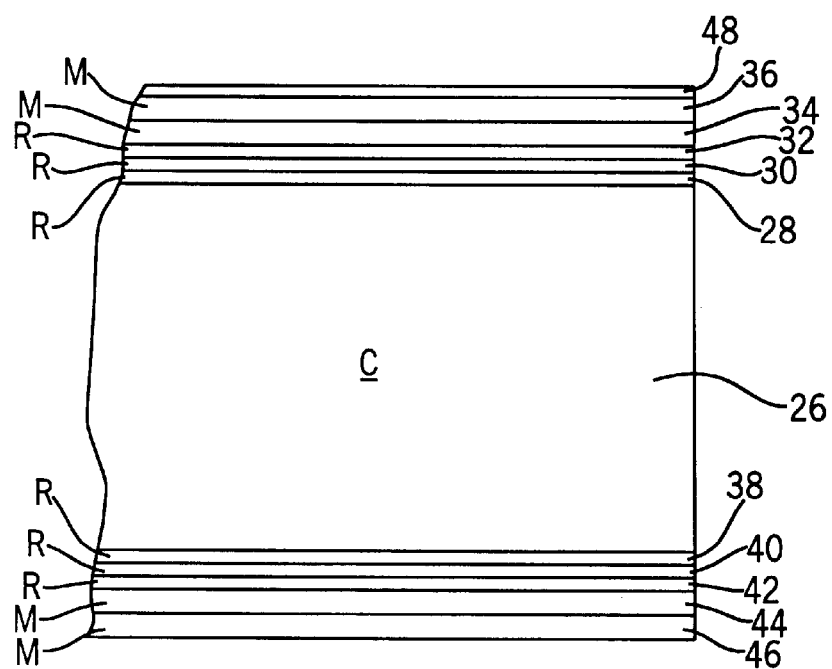
FIG. 2 is a sectional view taken along line 2—2 of FIG. 1.

FIG. 2 is an enlarged sectional view of the wall construction of container 20 of FIG. 1. The construction includes a substrate core 26 of energy absorbing material of sufficient thickness, preferably at least 0.5 inch thick, to provide a substantially rigid container wall, and is the above noted PVC core C in the above noted laminate code. The construction includes layers 28, 30, 32, 34, 36 on one side of core 26, and layers 38, 40, 42, 44, 46 on the other side of core 26. Layers 28, 30, 32, 38, 40, 42 are the above noted respective R layers in the above noted laminate code, each 0.02 inch thick. Layers 34, 36, 44, 46 are the above noted respective M layers in the above noted laminate code, each 0.03 inch thick. Layers 28, 30, 32 form a first region of a first fiberglass type on one side of core 26. Layers 34, 36 form a second region of a second type fiberglass on the first region. The second type fiberglass is different than the first type fiberglass, as above noted. It is significant that the noted first region of layers 28, 30, 32 is against the core, rather than the second region provided by layers 34, 36 being against the core. The second region provided by layers 34, 36 is a resin absorber and provides improved bonding of the laminate composite, including the sandwiching and bonding of the three woven roving layers 28, 30, 32 in the position shown, against core 26, and sandwiched between core 26 and layers 34, 36. Significant increases in strength and gas-expansion explosive withstand capability is enabled by the noted construction in the noted sequence, rather than placing the random chopped strand glass mat layers 34, 36 against the PVC core 26. Layers 38, 40, 42 form a third region of the noted first type fiberglass on the other side of core 26. Layers 44, 46 form a fourth region of the noted second type fiberglass on the third region. Again, the noted combination, number of layers, and sequencing is significant. The core plus ten layer structural combination is the best balance of the above noted design criteria. Reducing the number of layers, e.g. using 36 ounce S-glass and/or increased thickness, provides a less than optimum combination for various of the above noted design criteria, including weight and strength, which are critical in an aircraft. The above noted gel coat is provided at eleventh layer 48 on layer 36.

It is recognized that various equivalents, alternatives and modifications are possible within the scope of the appended claims.

What is claimed is:

1. A blast resistant laminate composite container wall construction for a bomb-resistant airline baggage container for withstanding gas-expansion explosives, consisting of:

a single substrate core of energy absorbing material of sufficient thickness to provide a substantially rigid container wall;

a first region of one or more layers of a first type fiberglass on said core;

a second region of one or more layers of a second type fiberglass on said first region, said second type fiberglass being different than said first type fiberglass;

a third region of one or more layers of fiberglass on the other side of said core;

a fourth region of one or more layers of fiberglass on said third region;

the fiberglass type of said third region being different than the fiberglass type of said second and fourth regions;

the fiberglass type of said fourth region being different than the fiberglass type of said first and third regions, wherein said core is a singular layer extending continuously between said first and third regions without bifurcation and without reinforcement by aramid material.

2. A blast resistant laminate composite container wall construction for a bomb-resistant airline baggage container for withstanding gas-expansion explosives, comprising:

a PVC substrate core of sufficient thickness to provide a substantially rigid container wall;

a first layer of woven roving fiberglass on one side of said core;

a second layer of woven roving fiberglass on said first layer;

a third layer of woven roving fiberglass on said second layer;

a fourth layer of random chopped strand fiberglass on said third layer;

a fifth layer of random chopped strand fiberglass on said fourth layer;

a sixth layer of woven roving fiberglass on the other side of said core;

a seventh layer of woven roving fiberglass on said sixth layer;

an eighth layer of woven roving fiberglass on said seventh layer;

a ninth layer of random chopped strand fiberglass on said eighth layer;

a tenth layer of random chopped strand fiberglass on said ninth layer.

3. The wall construction according to claim 2 comprising an eleventh layer of polyester gel coat on said fifth layer.

4. The wall construction according to claim 2 wherein each of said first, second, third, sixth, seventh and eighth layers is 24-ounce S-glass.

5. The wall construction according to claim 4 wherein:
said core is at least about 0.5 inch thick;
each of said first, second, third, sixth, seventh and eighth layers is about 0.02 inch thick;
each of said fourth, fifth, ninth and tenth layers is about 0.03 inch thick.

* * * * *